(12) United States Patent
Webb

(10) Patent No.: US 6,273,431 B1
(45) Date of Patent: Aug. 14, 2001

(54) FORGED VALVE STEM PACKING SET

(75) Inventor: Michael J. Webb, Berkshire (GB)

(73) Assignee: Garlock Inc, Palmyra, NY (US)

(*) Notice: Subject to any disclaimer, the term of this patent is extended or adjusted under 35 U.S.C. 154(b) by 0 days.

(21) Appl. No.: 09/440,352

(22) Filed: Nov. 15, 1999

(51) Int. Cl.[7] .................................................. F16J 15/18
(52) U.S. Cl. ........................... 277/529; 277/536; 277/539
(58) Field of Search ..................................... 277/529, 531, 277/534, 536, 539, 342, 329

(56) References Cited

U.S. PATENT DOCUMENTS

| | | | |
|---|---|---|---|
| 4,256,317 | * | 3/1981 | Havens et al. . |
| 4,281,840 | * | 8/1981 | Harris . |
| 4,327,923 | * | 5/1982 | Chesterton et al. . |
| 4,328,974 | | 5/1982 | White et al. . |
| 4,560,176 | * | 12/1985 | Hoff . |
| 4,826,181 | * | 5/1989 | Howard . |
| 5,201,532 | * | 4/1993 | Salesky et al. . |
| 5,228,701 | * | 7/1993 | Geinke et al. . |
| 5,522,603 | * | 6/1996 | Naitou et al. . |
| 5,803,464 | * | 9/1998 | Ueda et al. ............................ 277/528 |
| 5,806,858 | | 9/1998 | Harrelson, III . |
| 6,105,596 | * | 8/2000 | Hoyes et al. ....................... 137/15.17 |

FOREIGN PATENT DOCUMENTS

| | | |
|---|---|---|
| 1116200 | 1/1982 | (CA) . |
| 27 34 794 | 2/1979 | (DE) . |
| 2287772 | 9/1995 | (GB) . |

OTHER PUBLICATIONS

Control Engineering, *Controlling Fugitive Emissions in Control Valves*, Sep. 1995.

* cited by examiner

*Primary Examiner*—Anthony Knight
*Assistant Examiner*—Alison K. Pickard
(74) *Attorney, Agent, or Firm*—Cummings & Lockwood

(57) ABSTRACT

A three-ring packing set for a forged valve stem is disclosed which includes upper and lower adapter rings formed from fiber reinforced graphite tape and each having a first density and a first axial thickness, and an intermediate preform ring formed from graphite tape and having a second density that is less than the density of the upper and lower adapter rings and a second axial thickness that is less than the axial thickness of each of the adapter rings.

30 Claims, 2 Drawing Sheets

FORGED VALVE STEM PACKING SET

BACKGROUND OF THE INVENTION

1. Field of the Invention

This invention relates to stuffing box packings, and more particularly to a three-ring stuffing box packing set for forged valves.

2. Background of the Related Art

Stuffing box packing rings for sealing moving shafts are well known in the art. In general, they are used both as a fixed bearing and to prevent leakage in a stuffing box. Stuffing boxes are commonly employed with reciprocating shafts such as piston rods and rotating shafts such as valve stems.

Packing rings are typically formed from materials that have a capacity to prevent leakage, are non-abrasive and have a low coefficient of friction. A particularly effective material of construction for stuffing box packing rings is flexible graphite tape as it satisfies each of these criteria. Flexible graphite tape has one negative attribute however, in that it tends to extrude through fine clearances as a result of heavy compressive forces that are applied during packing installation. In the past, to control and prevent extrusion, packing assemblies have included anti-extrusion end rings which are often formed from braided packing materials, or the like.

An example of an extremely effective prior art stuffing box packing system for sealing the stuffing box of a valve stem is disclosed in U.S. Pat. No. 4,328,974 to White et al. the disclosure of which is herein incorporated by reference in its entirety. The packing system comprises first and second sealing assemblies separated from one another and supported between flat rigid spacer rings. Each sealing assembly includes a low density graphite preform ring and a higher density die-forned graphite adapter ring. Each preform ring has a density of about 1.1 g/cc to about 0.7 g/cc and each adapter ring has a density of about 1.4 g/cc to about 1.7 g/cc. The facing surfaces of the rings are each oriented at an acute angle to the longitudinal axis of the packing, with the angle in one surface being about 45° and the other being about 60°.

During packing installation, the differing densities and the difference in angles between the facing surfaces of the high density adapter rings and the low density preform rings provide a predictable stress, that causes the material to flow and expand in a controlled manner through deformation, forming an effective seal around the valve stem. The packing assembly disclosed in the White et al. patent also includes anti-extrusion braided packing rings which act as wipers to strip graphite particles from the valve stem and absorb them into the braid.

A more recent example of a stuffing box packing assembly for valve stems, shafts and piston rods is disclosed in U.S. Pat. No. 5,806,858 to Harrelson, III, the disclosure of which is also herein incorporated by reference in its entirety. The packing is a five-ring assembly consisting of three nested graphite rings of equal size rigidly supported between two braided anti-extrusion end rings. The graphite rings are die-formned from flexible graphite tape and have a density of about 0.5 g/cc to about 1.4 g/cc, and the braided end rings are die-formed from reinforced braided-stock and have a density in excess of 1.8 g/cc. The lower density graphite rings have facing surfaces oriented at a 45° angle, and the higher density end rings have facing surfaces oriented at 60° angles, so as to cause the lower density material to flow and expand during installation. Advantageously, the braided end rings, being relatively rigid, are unaffected by the compressive forces applied during packing. They serve as wiper rings to remove particles of graphite from the shaft or valve stem and provide extrusion protection for the packing.

Industrial piping systems generally employ several different types of valves for performing various fluid control tasks. Some industrial valves are relatively expensive and are often reconditioned after a certain period of service. Other valves, such as forged valves, are less expensive, and are generally discarded after a certain period of service due to wear. In such instances, the use of relatively expensive valve packing sets, such as the eleven and seven-ring packing sets disclosed in U.S. Pat. No. 4,328,974 to White et al. or the five-ring packing set disclosed in U.S. Pat. No. 5,806,858 to Harrelson, III, are not economical. Indeed, in such instances such complex valve packing sets may cost as much or more than the valve itself.

Therefore, it would be beneficial to provide an inexpensive stuffing box packing set for use in conjunction with a forged valve stem, or the like. Such a packing set would not require the use of anti-extrusion rings, wiper rings, resiliency rings, spacer rings or the like.

SUMMARY OF THE INVENTION

The subject invention is directed to a stuffing box packing set for a forged valve stem which does not require specialized anti-extrusion components. Accordingly, the valve stem packing set of the subject invention does not make use of anti-extrusion end rings, wiper rings, resiliency rings, or the like. This simplifies the design of the packing set and significantly reduces its cost as compared to prior art stuffing box packing sets.

The stuffing box packing set of the subject invention preferably includes three packing rings including an upper adapter ring formed from reinforced graphite tape, having a first density and a first axial thickness, an intermediate preform ring formed from graphite tape, having a second density less than the density of the upper adapter ring and a second axial thickness less than the axial thickness of the upper adapter ring, and a lower adapter ring formed from reinforced graphite tape, having a density equal to the density of the upper adapter ring and having an axial thickness equal to the axial thickness of the upper adapter ring.

Preferably, the upper and lower adapter rings each have a density of about approximately 1.1 g/cc to about approximately 1.92 g/cc, and the intermediate preform ring has a density of about approximately 0.7 g/cc to about approximately 1.4 g/cc. In a preferred embodiment of the subject invention, the intermediate preform ring has opposed upper convex and lower concave facing surfaces that are inclined at acute angles with respect to the axis of the stuffing box. Likewise, the upper adapter ring has a lower concave facing surface inclined at an acute angle with respect to the axis of the stuffing box and the lower adapter ring has an upper convex facing surface inclined at an acute angle with respect to the axis of the stuffing box.

Preferably, the angle of inclination of the facing surfaces of the intermediate preform ring differ from the facing surfaces of the upper and lower adapter rings. In particular, the lower facing surface of the upper adapter ring and the upper facing surface of the lower adapter ring are inclined at an angle of about approximately 30°. Furthermore, the upper and lower facing surfaces of the intermediate packing ring are inclined at an angle of about approximately 45°.

In accordance with a preferred embodiment of the subject invention, the upper and lower adapter rings are formed from reinforced graphite tape, wherein the tape is reinforced with fibers or filaments (strands) selected from the group consisting of metallic filaments or fibers, inorganic fibers or filaments, and organic filaments or fibers. In instances wherein the graphite tape is reinforced with metallic fibers or filaments, they may be stainless steel fibers or filaments, such as, for example, Inconel® fibers or filaments. In instances wherein the graphite tape is reinforced with inorganic fibers or filaments, they may be glass fibers or filaments. In instances wherein the graphite tape is reinforced with organic fibers or filaments, they may be aramid fibers or filaments. In each case, the reinforcing fibers or filaments perform an anti-extrusion function.

These and other features of the forged valve packing set of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to make and use the forged valve stem packing set of the subject invention, preferred embodiments thereof will be described in detail hereinbelow with reference to the drawings wherein.

DETAILED DESCRIPTION OF THE PREFERRED EMBODIMENTS

Figure 1:
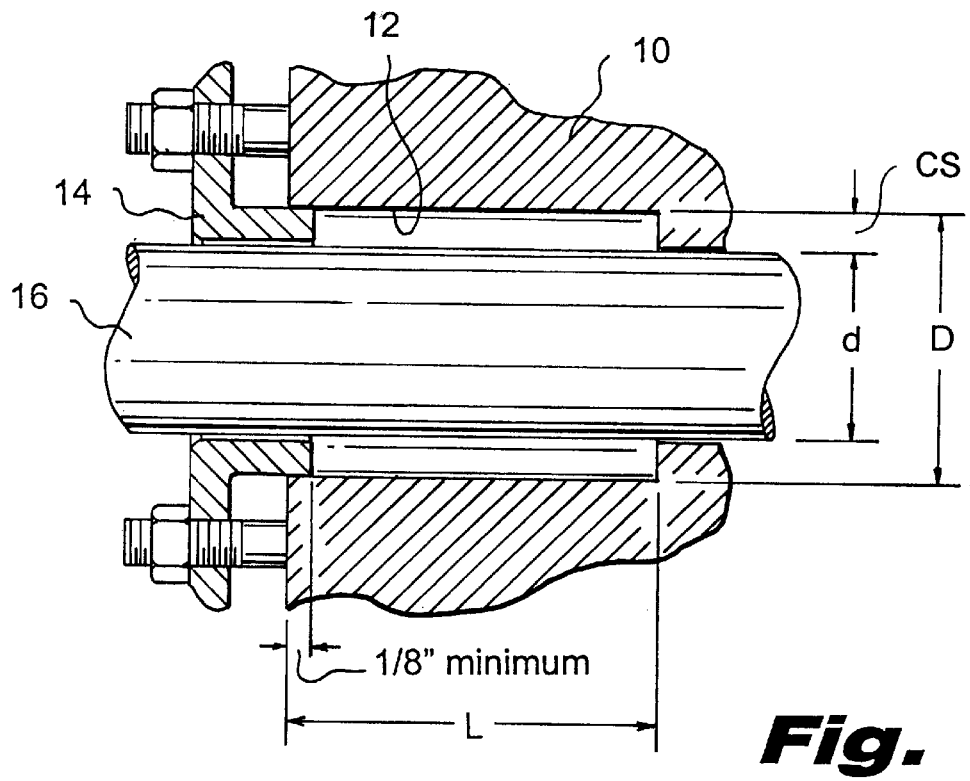
FIG. 1 is a cross-sectional view through a horizontal stuffing box of a forged valve body, valve stem and gland follower, and defining the conventional dimensions associated therewith.

Referring now in detail to the drawings wherein like reference numerals identify similar structural elements of the subject invention, there is illustrated in FIG. 1 a stuffing box 12 formed in the body of a valve 10 with which the three-ring valve packing set of the subject invention may be employed. In accordance with a preferred embodiment of the subject invention, valve 10 is a general purpose, low cost forged valve, such as, an on-off control valve. However, it is envisioned that the subject invention may be employed with other more expensive types of valves, such as, for example, needle valves, quarter-turn valves, plug valves, cast valves, gate valves, globe valves or the like.

Referring to FIG. 1, stuffing box 12 has a box depth "L" and an interior cross-sectional diameter designated by "D". A gland follower 14 is adjustably mounted at the upper end of stuffing box 12 and the forged valve stem 16 is supported within the stuffing box 12. The lower end of the gland follower 14 extends into stuffing box 12 a minimum distance of about 1/8" to adequately compress the packing rings located within the stuffing box. By convention, the valve stem 16 has a diameter designated by "d" and the radial distance between the outer diameter of the valve stem 16 (also known as the I.D. of the stuffing box) and the inner wall of the stuffing box 12 (also known as the O.D. of the stuffing box) is commonly referred to as the cross-sectional dimension "CS" of the stuffing box. The dimensions associated with a stuffing box relate to one another in accordance with the following mathematical expression:

$$D = d + (2 \times CS)$$

Thus, it follows that $$CS = (D-d)/2$$

In general, the stuffing box depth "L" is about five to seven and one-half times the cross-sectional dimension of the stuffing box or about 5.0·CS to about 7.5·CS.

Figure 2:
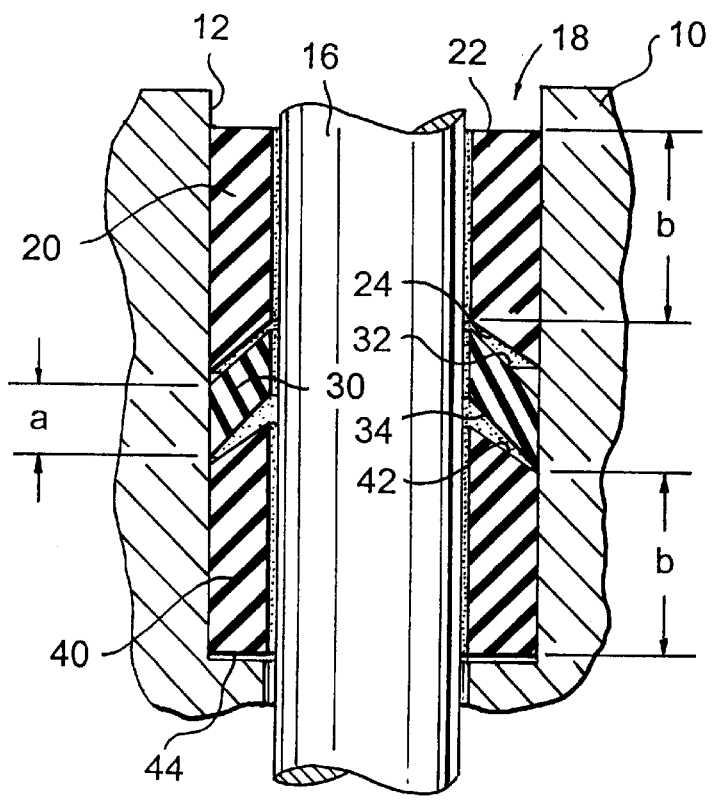
FIG. 2 is a cross-sectional view through a vertical stuffing box, valve stem and three-ring packing set constructed in accordance with a preferred embodiment of the subject invention prior to tightening of the gland follower.

Referring now to FIG. 2, there is illustrated a stuffing box packing set constructed in accordance with a preferred embodiment of the subject invention and designated generally by reference numeral 18. Packing set 18 is comprised of three nested packing rings. The three rings include an upper adapter ring 20, an intermediate preform ring 30 and a lower adapter ring 40. The intermediate preform ring 30 is preferably formed from high purity, textured flexible graphite tape. Flexible graphite tape or ribbon is manufactured by exfoliating or expanding, and then compressing, natural graphite flakes to a specified density. Graphite is known to have a nearly universal chemical inertness and is naturally lubricious, compatible and resilient. Graphite tape packings are impervious to gases and fluids, corrosion resistant, have a low coefficient of friction and are noted for their excellent thermal properties enabling them to be used in applications to 5500° F. (3000° C.).

The upper and lower adapter rings 20 and 40, are each die-formed from fiber or filament reinforced graphite tape. Preferably, the graphite tape is reinforced with Inconel® filaments or fibers which are embedded into and extend along the length of the tape. In operation, the Inconel® filaments or fibers perform an anti-extrusion function by blocking clearances, much like the braided packing rings of prior art packing sets. Inconel®, which is manufactured by INCO International of Huntington, WV, belongs to a class of nickel alloys commonly referred to as 600 series alloys.

Those skilled in the art will readily appreciate that other fibers or filaments may used to reinforce the graphite tape from which the intermediate preform ring is manufactured. For example, the graphite tape may be reinforced with such metallic filaments as 300 and 400 series stainless steels, 17-4pH stainless steels or copper. Alternatively, the tape may be reinforced with an aromatic polyamide fiber. Such fibers, often referred to as aramid fibers have excellent resistance to high temperatures and exceptional tensile strength.

It is also envisioned that glass fibers may be utilized to reinforce the graphite tape used in forming the preform ring, as such materials have superior thermal properties, dimensional stability and tensile strength. Other alternatives include organic fibers, such as, polybenzimidazole fibers, which maintain dimensional stability at high temperatures and are compatible in a wide range of chemicals and solvents. In accordance with the subject invention, the graphite adapter rings and the preform ring can be either tape wound (also known as spiral wrapped) or laminated (meaning "sandwiched" using flat layers of graphite).

The upper and lower adapter rings 20 and 40 of packing set 18 have the same density. Specifically, adapter rings 20 and 40 have a density in the range of about 1.10 g/cc to about 1.92 g/cc (about 68.6 lbs/ft$^3$ to about 120.0 lbs/ft$^3$). In a preferred embodiment of the subject invention, adapter rings 20 and 40 both have a density of about 1.64 g/cc (102.3 lbs/ft$^3$). In contrast, intermediate preform ring 30 has a density in the range of about 0.70 g/cc to about 1.92 g/cc (about 48.0 lbs/ft$^3$ to about 96.0 lbs/ft$^3$). In a preferred embodiment of the subject invention, preform ring 30 has a density of about 1.10 g/cc (68.6 lbs/ft$^3$). The preform ring 30 can have uniform density or not, as long as the end thereof has a low enough density such that it will flow radially and axially into open areas of the stuffing box and against and into contact with either the stem or stuffing box, and will then compress into an impervious and effective seal.

The lower density die-formed preform ring is preferably held together by mechanically interlocking or folding the spiral wrapped tape layers. It is envisioned, however, that the die-formed preform rings may be held together during formation, handling, and installation by the use of a minimum amount of adhesive, preferably a rubber based adhesive, under the innermost and outermost plies. For laminated graphite preform rings, adhesive would preferably be used on every layer. Other means can be used for maintaining the structural integrity of the preform rings including, for example, mechanical means such as zinc staples.

The selected density of either packing ring will depend upon the service conditions in which the packing set of the subject invention is employed. Moreover, if the packing set 18 is used in low-pressure conditions, and valve stem 16 is friction sensitive, the respective densities of adapter rings 20, 40 and preform ring 30 will be at the lower ends of the corresponding ranges. Conversely, if the packing set 18 is employed in highpressure service, the density parameters would fall at the upper ends of the corresponding density ranges.

The three-ring packing set 18 of the subject invention has a cup and cone configuration in which the upper and lower adapter rings 20 and 40 have similar geometry. In particular, as illustrated in FIG. 2, upper adapter ring 20 has an upper facing surface 22 which extends perpendicular to the axis of stuffing box 12 and which is configured to abut against the lower end of gland follower 14. Adapter ring 20 further includes a concave lower facing surface 24, inclined at about approximately 30° with respect to the axis of stuffing box 12, for cooperating with the upper convex facing surface 32 of intermediate preform ring 30. Similarly, lower adapter 40 has an lower facing surface 44 which extends perpendicular to the axis of stuffing box 12 and which is configured to abut the lower surface of stuffing box 12. Adapter ring 40 further includes a convex upper mating surface 42, inclined at about approximately 30° with respect to the axis of stuffing box 12 for cooperating with a lower concave facing surface 34 of preform ring 30. In accordance with the subject invention, the upper convex and lower concave facing surfaces 32 and 34 of intermediate preform ring 30 are both inclined at about approximately 45° with respect to the axis of the stuffing box 12.

Figure 3A:
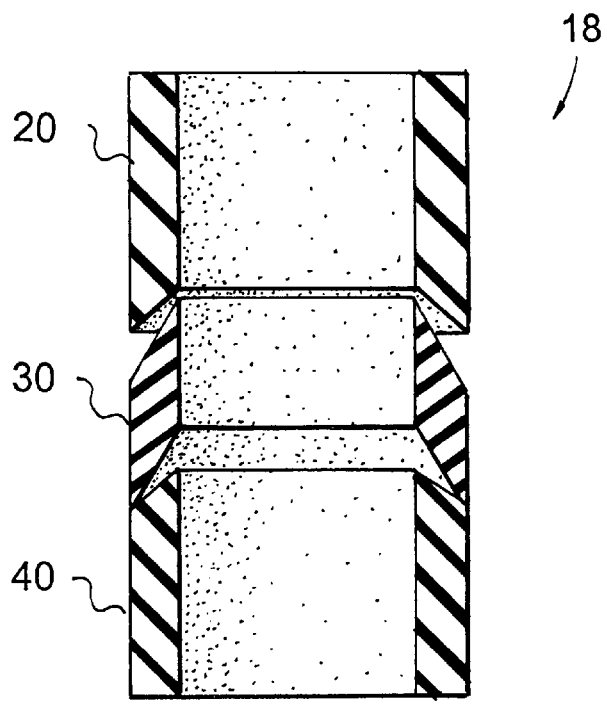
FIG. 3a is a cross-sectional view of a three-ring packing set constructed in accordance with a preferred embodiment of the subject invention prior to packing installation.
Figure 3B:
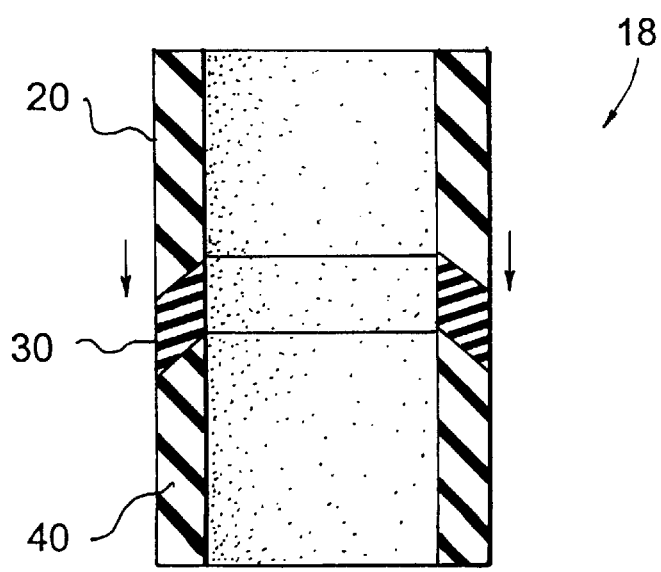
FIG. 3b is a cross-sectional view of the three-ring packing set of FIG. 3a following packing installation, wherein the graphite material from which the intermediate preform ring is formed has undergone radial flow.

The difference between the facing or mating angles of the higher density adapter rings 20, 40 and the lower density preform ring 30 provide direct loading of the center preform ring and a predictable stress during packing installation that causes the lower density graphite material of the preform ring to undergo radial flow in a controlled manner, as illustrated, for example, in FIGS. 3a and 3b. This radial flow or expansion forms an effective seal within the stuffing box 12 and around the valve stem 16. The term "packing installation" means during the period that the packing gland 14 is initially tightened. Those skilled in the art will readily appreciate that other angles than those disclosed herein can also be used for the angles of the facings surfaces of the preform and adapter rings in order to achieve a desired predictable stress during packing installation.

As discussed above with respect to FIG. 1, the overall axial thickness of a three ring packing set is typically dictated by the depth "L" of the stuffing box of a particular valve. In accordance with the subject invention, the axial thickness of each of the higher density adapter rings 20, 40 is greater than the axial thickness or height of the lower density preform ring 30.

With reference to FIG. 2, the axial thickness of the intermediate preform ring 30 is indicated by dimensional reference character "a" while the axial thickness of each adapter ring is indicated by dimensional reference character "b". In the description which follows, the axial thickness of each packing ring will be described with respect to the crosssectional dimension "CS" of the stuffing box, as illustrated for example in FIG. 1.

In an embodiment of the subject invention, the preform ring 30 has an axial thickness "a" of about approximately one times the cross-section of the stuffing box or CS, while the upper and lower adapter rings each have an axial thickness "b" of about approximately two and one-half times the cross-section of the stuffing box or 2.5·CS. Thus, in such an embodiment of the subject invention, the overall axial thickness of the three-ring packing set 18 and the corresponding depth "L" of the stuffing box with which it is associated is approximately six times cross-section or approximately 6·CS.

The stuffing box depth of many forged valves is generally about five times the cross-sectional dimension associated therewith or 5·CS. Thus, in many applications, the three-ring packing set of the subject invention would include upper and lower adapter rings which have an axial thickness "b" of approximately 2·CS and an intermediate preform ring having an axial thickness "a" of about CS.

With continuing reference to the dimensions illustrated in FIG. 1, it is envisioned that the axial thickness "a" of the intermediate preform ring 30 can vary within a range from about one-half cross-section to about two times cross-section (about 0.5·CS to about 2·CS). Likewise, the axial thickness "b" of each adapter ring 20, 40 can vary within a range of about three-quarters cross-section to about three times cross-section (about 0.75·CS to about 3·CS). The axial thickness of each component will depend largely upon the depth "L" of the stuffing box and the service requirements of the valve.

The effectiveness of a preferred embodiment of the three-ring packing set of the subject invention has been compared to a conventional five-ring packing set including top and bottom braided graphite end rings and three central die-formed graphite packing rings, each having a square cross-section. The test employed a three-ring packing set having the following configuration:

The upper and lower adapter rings had a density of approximately 1.64 g/cc and the preform ring had a density of approximately 1.1 g/cc. The axial thickness "b" of the higher density adapter rings was about two and one-half times cross-section (2.5·CS) and the axial thickness "a" of the lower density intermediate perform ring was about one time cross-section (CS).

The test involved five thermal cycles, each simulating a plant start-up, run and shut down. During each thermal cycle, the forged valve was heated from ambient temperature to 250° C. (482° F.), the valve stem was cycled twenty times, an emission reading was taken, and the valve was allowed to cool back down to room temperature. A stem cycle involves rotating the valve stem from a full open position, to a full closed position, and back to a full open position. The operating pressure was 580 psi (40 bars) and the testing media was 99+% pure Methane. After five thermal cycles (i.e., 100 stem cycles), the three ring packing set of the subject invention indicated 0 ppm leakage levels. By comparison, 50 to 200 ppm leakage levels were detected in connection with the conventional five-ring packing set.

Although the forged valve packing set of the subject invention has been described with respect to a preferred embodiment, it is apparent that modifications and changes can be made thereto without departing from the spirit and scope of the invention as defined by the appended claims.

What is claimed is:

1. A stuffing box packing for a valve stem, comprising:
   a) an upper adapter ring formed from reinforced graphite tape, having a first density and a first axial thickness;
   b) an intermediate preform ring formed from graphite tape, having a second density less than the density of the upper adapter ring and a second axial thickness less than the axial thickness of the upper adapter ring; and
   c) a lower adapter ring formed from reinforced graphite tape, having a density equal to the density of the upper adapter ring and having an axial thickness equal to the axial thickness of the upper adapter ring, wherein the upper and lower adapter rings are formed by means other than braiding and the intermediate preform ring is nested between the upper and lower adapter rings.

2. A packing as recited in claim 1, wherein said upper and lower adapter rings each have a density of about approximately 1.1 g/cc to about approximately 1.92 g/cc.

3. A packing as recited in claim 1, wherein said intermediate preform ring has a density of about approximately 0.7 g/cc to about approximately 1.4 g/cc.

4. A packing as recited in claim 1, wherein said intermediate preform ring has opposed upper convex and lower concave facing surfaces that are inclined at acute angles with respect to the axis of the stuffing box.

5. A packing as recited in claim 4, wherein said upper adapter ring has a lower concave facing surface inclined at an acute angle with respect to the axis of the stuffing box and said lower adapter ring has an upper convex facing surface inclined at an acute angle with respect to the axis of the stuffing box.

6. A packing as recited in claim 4, wherein the angle of inclination of the facing surfaces of the intermediate preform ring differ form the facing surfaces of the upper and lower adapter rings.

7. A packing as recited in claim 6, wherein the lower facing surface of said upper adapter ring and the upper facing surface of said lower adapter ring are inclined at an angle of about approximately 30°.

8. A packing as recited in claim 6, wherein the upper and lower facing surfaces of said intermediate packing ring are inclined at an angle of about approximately 45°.

9. A packing as recited in claim 1, wherein the upper and lower adapter rings are formed from filament reinforced graphite tape, wherein the filaments are selected from the group consisting of metallic filaments, inorganic filaments and organic filaments.

10. A packing as recited in claim 1, wherein the upper and lower adapter rings are formed from fiber reinforced graphite tape, wherein the fibers are selected from the group consisting of metallic fibers, inorganic fibers and organic fibers.

11. A packing as recited in claim 1, wherein the upper and lower adapter rings are formed from reinforced graphite tape, wherein the reinforcing material is Inconel®.

12. A packing as recited in claim 1, wherein the stuffing box has a diameter "D" and the valve stem has a diameter "d" such that the stuffing box has a cross-sectional dimension "CS" expressed by (D−d)/2, whereby each adapter ring has an axial thickness in the range of about approximately 0.5·CS to about approximately 3·CS, and said preform ring has an axial thickness in the range of about approximately 0.75·CS to about approximately 2·CS.

13. A stuffing box packing for a valve stem comprising:
   a) an upper adapter ring formed from reinforced graphite tape, having a first density and a first axial thickness, said upper adapter ring having a lower concave facing surface;
   b) an intermediate preform ring formed from graphite tape, having a second density less than the density of the upper adapter ring and a second axial thickness less than the axial thickness of the upper adapter ring, said intermediate preform ring having opposed upper convex and lower concave facing surfaces; and
   c) a lower adapter ring formed from reinforced graphite tape, having a density equal to the density of the upper adapter ring and having an axial thickness equal to the axial thickness of the upper adapter ring, said lower adapter ring having an upper convex facing surface, wherein the upper and lower adapter rings are formed by means other than braiding and the intermediate preform ring is nested between the upper and lower adapter rings.

14. A packing as recited in claim 13, wherein said upper and lower adapter rings each have a density of about approximately 1.1 g/cc to about approximately 1.92 g/cc.

15. A packing as recited in claim 13, wherein said intermediate preform ring has a density of about approximately 0.7 g/cc to about approximately 1.4 g/cc.

16. A packing as recited in claim 13, wherein the angle of inclination of the facing surfaces of the intermediate preform ring differ from the facing surfaces of the upper and lower adapter rings.

17. A packing as recited in claim 16, wherein the lower facing surface of said upper adapter ring and the upper facing surface of the lower adapter ring are inclined at an angle of about approximately 30°.

18. A packing as recited in claim 17, wherein the upper and lower facing surfaces of said intermediate preform ring are inclined at an angle of about approximately 45°.

19. A packing as recited in claim 13, wherein the upper and lower adapter rings are formed from reinforced graphite tape, wherein the reinforcing material is Inconel®.

20. A packing as recited in claim 13, wherein the stuffing box has a diameter "D" and the valve stem has a diameter "d" such that the stuffing box has a cross-sectional dimension "CS" expressed by (D−d)/2, whereby each adapter ring has an axial thickness in the range of about approximately 0.5·CS to about approximately 3·CS, and said preform ring has an axial thickness in the range of about approximately 0.75·CS to about approximately 2·CS.

21. A three-ring stuffing box packing set for a valve stem, wherein the stuffing box has a diameter "D" and the valve stem has a diameter "d" such that the stuffing box has a cross-sectional dimension "CS" expressed by (D−d)2, the packing set comprising:
   a) an upper adapter ring formed from reinforced graphite tape having a first density and a first axial thickness in the range of about approximately 0.5·CS to about approximately 3·CS;

b) an intermediate preform ring formed from graphite tape having a second density less than the density of the upper adapter ring and a second axial thickness less than the axial thickness of the upper adapter ring in the range of about approximately 0.75·CS to about approximately 2·CS; and c) a lower adapter ring formed from reinforced graphite having a density equal to the density of the upper adapter ring and having an axial thickness equal to the axial thickness of the upper adapter ring, wherein the upper and lower adapter rings are formed by means other than braiding and the intermediate preform ring is nested between the upper and lower adapter rings.

22. A packing set as recited in claim 21, wherein said upper and lower adapter rings each have a density of about approximately 1.1 g/cc to about approximately 1.92 g/cc.

23. A packing set as recited in claim 21, wherein said intermediate preform ring has a density of about approximately 0.7 g/cc to about approximately 1.4 g/cc.

24. A packing set as recited in claim 21, wherein said intermediate preform ring has opposed upper convex and lower concave facing surfaces that are inclined at acute angles with respect to the axis of the packing set.

25. A packing as recited in claim 24, wherein said upper adapter ring has a lower concave facing surface inclined at an acute angle with respect to the axis of the packing set and said lower adapter ring has an upper convex facing surface inclined at an acute angle with respect to the axis of the packing set.

26. A packing as recited in claim 25, wherein the angle of inclination of the facing surfaces of the intermediate preform ring differ form the facing surfaces of the upper and lower adapter rings.

27. A packing as recited in claim 26, wherein the lower facing surface of said upper packing ring and the upper facing surface of the lower packing ring are inclined at an angle of about approximately 30°.

28. A packing as recited in claim 26, wherein the upper and lower facing surfaces of said intermediate packing ring are inclined at an angle of about approximately 45°.

29. A packing as recited in claim 21, wherein the upper and lower adapter rings are formed from fiber reinforced graphite tape, wherein the fiber is selected from the group consisting of metallic fibers, inorganic fibers and organic fibers.

30. A packing as recited in claim 21, wherein the upper and lower adapter rings are formed from reinforced graphite tape, wherein the reinforcing material is Inconel®.

* * * * *